United States Patent
Steinhilb et al.

(10) Patent No.: US 8,403,391 B2
(45) Date of Patent: Mar. 26, 2013

(54) FENDER STRUCTURE ASSEMBLIES FOR VEHICLES

(75) Inventors: Aaron Richard Steinhilb, Westland, MI (US); Kyle Andrew Ott, Ypsilanti, MI (US); Daniel Justin Koenen, Tecumseh, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/450,580

(22) Filed: Apr. 19, 2012

(65) Prior Publication Data

US 2012/0200122 A1     Aug. 9, 2012

Related U.S. Application Data

(63) Continuation of application No. 12/484,389, filed on Jun. 15, 2009, now Pat. No. 8,182,027.

(51) Int. Cl.
*B62D 27/00* (2006.01)

(52) U.S. Cl. ............... 296/29; 296/187.03; 296/203.01; 296/191

(58) Field of Classification Search ............ 296/29, 296/187.03, 187.09, 198, 187.04, 203.03, 296/193.11, 203.02, 191, 30; 188/371, 372, 188/374; 293/133; 248/274.1
See application file for complete search history.

(56) References Cited

U.S. PATENT DOCUMENTS

| | | | |
|---|---|---|---|
| 5,096,223 A * | 3/1992 | Tekelly et al. | 280/748 |
| 6,554,341 B2 | 4/2003 | Lee | |
| 6,612,644 B2 | 9/2003 | Ahn | |
| 6,676,197 B2 | 1/2004 | Ozawa | |
| 6,698,820 B2 | 3/2004 | Nakata | |
| 6,824,199 B2 | 11/2004 | Weik et al. | |
| 6,926,349 B2 | 8/2005 | Cordebar et al. | |
| 7,128,339 B2 * | 10/2006 | Mani | 280/752 |
| 7,159,911 B2 | 1/2007 | Nguyen et al. | |
| 7,413,239 B2 | 8/2008 | Mitsuyama | |
| 7,497,503 B2 | 3/2009 | Ito | |
| 2004/0251716 A1 | 12/2004 | Choi et al. | |
| 2006/0064845 A1 | 3/2006 | Fiji et al. | |

FOREIGN PATENT DOCUMENTS

| | | |
|---|---|---|
| JP | 2001287669 | 10/2001 |
| JP | 2003118639 | 4/2003 |
| JP | 2006224800 | 8/2006 |

* cited by examiner

*Primary Examiner* — Glenn Dayoan
*Assistant Examiner* — Pinel Romain
(74) *Attorney, Agent, or Firm* — Dinsmore & Shohl LLP

(57) ABSTRACT

An attachment bracket for mounting a fender of a vehicle to a side structural member includes a top portion that connects to the fender. A first vertical leg connects to the side structural member. The first vertical leg extends downwardly from an edge of the top portion. A second vertical leg connects to the side structural member. The second vertical leg extends downwardly from an opposite edge of the top portion. The first vertical leg includes a bend separating the first vertical leg into an upper portion and a lower portion. The first vertical leg has a central opening at the bend that is spaced vertically from the top portion and a bottom end of the first vertical leg.

19 Claims, 7 Drawing Sheets

FENDER STRUCTURE ASSEMBLIES FOR VEHICLES

CROSS-REFERENCE

This application is a continuation of U.S. patent application Ser. No. 12/484,389, filed Jun. 15, 2009, entitled FENDER STRUCTURE ASSEMBLIES FOR VEHICLES, the details of which are incorporated herein by reference in their entirety.

TECHNICAL FIELD

The present specification generally relates to fender structure assemblies for vehicles and, more specifically, to fender panel mounting structures for use in mounting fenders to vehicles.

BACKGROUND

A number of countries have organizations that monitor safety performance of automobiles. For example, the European New Car Assessment Program (Euro NCAP) and the Japan New Car Assessment Program (JNCAP) provide rating schemes for crash testing automobiles. One area of interest relates to pedestrian head impacts, for example, along the front of the vehicle.

It is known that automobile bodies are typically formed of a number of panels that are mounted to support structures. One such panel is a fender structure, which is disposed on an apron structural member. Fender attachment brackets have been proposed for attaching the fender structure to an apron structural member and function to absorb impact energy.

SUMMARY

In one embodiment, an attachment bracket for mounting a fender of a vehicle to a side structural member includes a top portion that connects to the fender. A first vertical leg connects to the side structural member. The first vertical leg extends downwardly from an edge of the top portion. A second vertical leg connects to the side structural member. The second vertical leg extends downwardly from an opposite edge of the top portion. The first vertical leg includes a bend separating the first vertical leg into an upper portion and a lower portion. The first vertical leg has a central opening at the bend that is spaced vertically from the top portion and a bottom end of the first vertical leg.

In another embodiment, a vehicle having a fender structure assembly includes a fender having an outer portion and a connecting portion. An attachment bracket mounts the fender to a side structural member. The attachment bracket includes a top portion connected to the connecting portion. A first vertical leg is connected to the side structural member. The first vertical leg extends downwardly from an edge of the top portion. A second vertical leg is connected to the side structural member. The second vertical leg extends downwardly from an opposite edge of the top portion. The first vertical leg includes a bend separating the first vertical leg into an upper portion and a lower portion. The first vertical leg has a central opening at the bend that is spaced vertically from the top portion and a bottom end of the first vertical leg.

In another embodiment, a fender structure assembly of a motor vehicle includes a fender including an outer portion extending downwardly toward a wheel, a vertical portion extending downwardly from the outer portion and a connecting portion. An attachment bracket mounts the fender to the side structural member. The attachment bracket includes a top portion connected to the connecting portion. A first vertical leg is connected to the side structural member. The first vertical leg extends downwardly from an edge of the top portion and includes two or more openings spaced-apart vertically from each other along a length of the first vertical leg. A second vertical leg is connected to the side structural member. The second vertical leg extends downwardly from an opposite edge of the top portion and includes two or more openings spaced-apart vertically from each other along a length of the second vertical leg. The first and second vertical legs buckle at each of their respective two or more openings upon an impact to the fender structure assembly.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
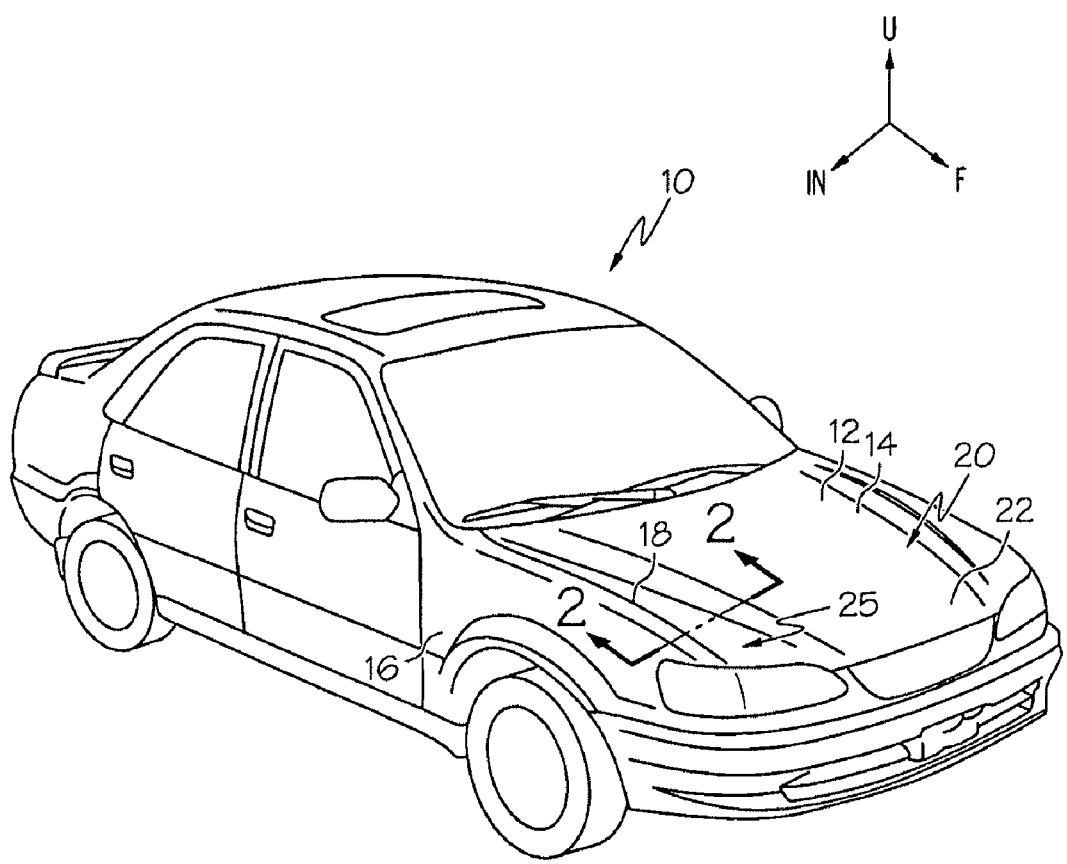
FIG. 1 is a perspective view of an embodiment of a motor vehicle.
Figure 2:
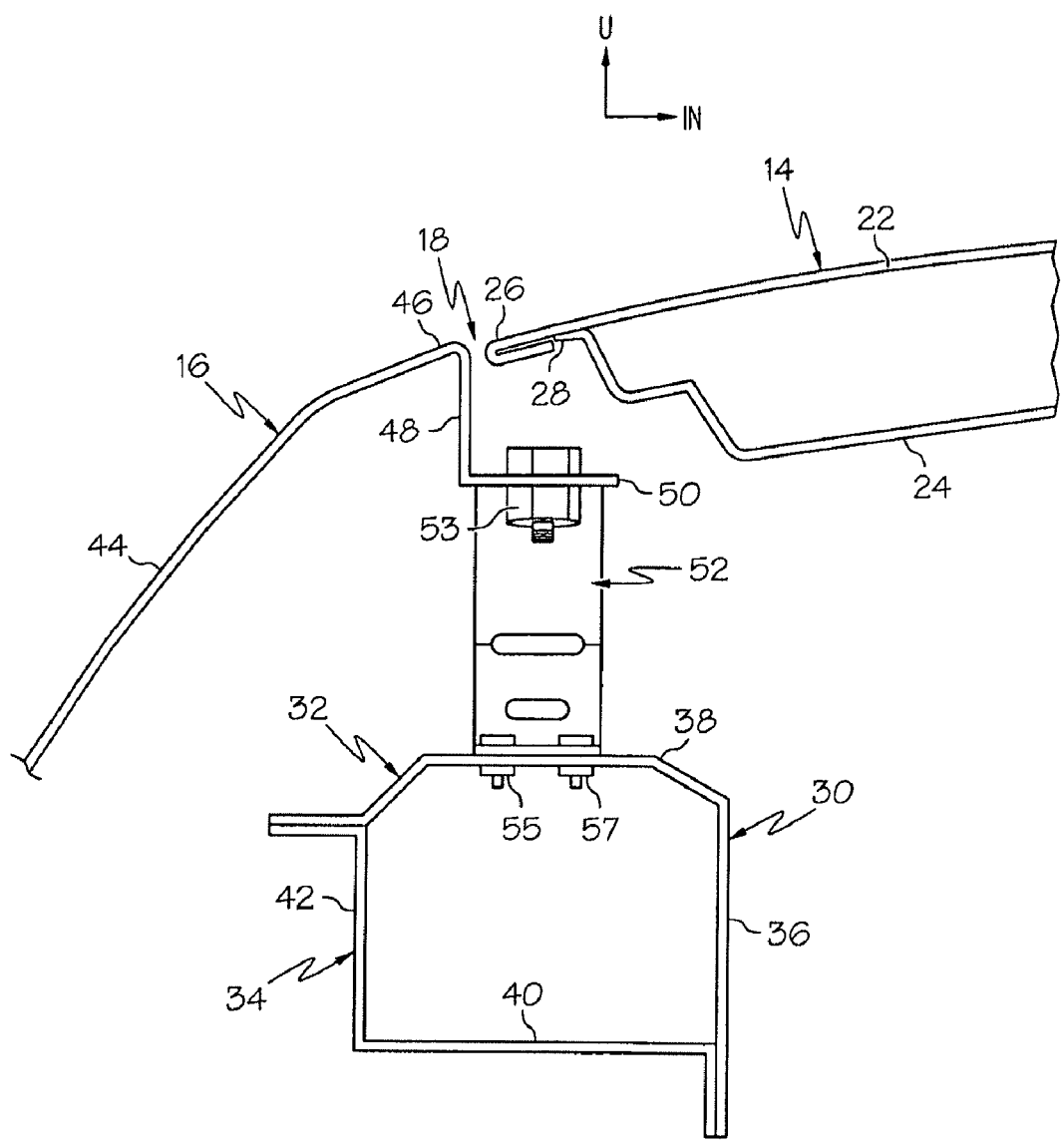
FIG. 2 is a diagrammatic section view along lines 2-2 of FIG. 1 illustrating an embodiment of a fender structure.

FIG. 1 generally depicts one embodiment of a motor vehicle 10 where arrows F, U and IN denote forward, upward and widthwise inward directions of the vehicle 10. The vehicle 10 includes a vehicle body 12 with a hood 14, a front fender 16 and a boundary line 18 running along the length of the vehicle 10 between the hood 14 and the fender 16. The hood 14 (which may be formed of a metal material) is generally disposed above an engine compartment 20 so as to be able to open the hood 14 to gain access to the engine compartment 20. The hood 14 may be formed of multiple panels, such as an outer hood panel 22 and an inner hood panel 24 (FIG. 2). The front fender 16, which may be formed of a metal or plastic material, is located to a side of the outer hood panel 22. As will be described in greater detail below, the front fender 16 is attached to a side or apron structural member by attachment brackets forming a fender structural assembly generally designated element 25 that is positioned along the length of the vehicle 10.

Referring to FIG. 2, the inner hood panel 24 is located on a lower side of the outer hood panel 22. The inner hood panel 24 may be attached to the outer hood panel 22 such that an outer edge portion 26 of the outer hood panel 22 is fixed by hemming to an outer flange 28 of the inner hood panel 24 that projects outward in the vehicle widthwise direction. Any other suitable connection structure may be used to connect the inner and outer hood panels 24 and 22.

The side or apron structural member 30 is located below the boundary line 18 between the hood 14 and the front fender 16. The apron structural member 30 extends generally in the lengthwise direction of the vehicle 10 with the boundary line 18. The apron structural member 30 includes an upper apron member 32 and a lower apron member 34. The upper apron member 32 includes a vertical portion 36 that is connected to a horizontal portion 38 forming a somewhat L-shaped section as viewed in the lengthwise direction of the vehicle 10. The lower apron member 34 includes a horizontal portion 40 connected to a vertical portion 42 forming a somewhat L-shaped section as viewed in the lengthwise direction of the vehicle 10. The upper and lower apron members 32 and 34 may be connected in any suitable manner such as by fasteners, welding, etc. In some embodiments, the upper apron member 32 and the lower apron member 34 cooperate to form a closed space or area that extends in the lengthwise direction of the vehicle 10. Other configurations are possible for the apron structural member 30, such as a U-shaped upper member that is connected to an L-shaped lower member.

Figure 3:
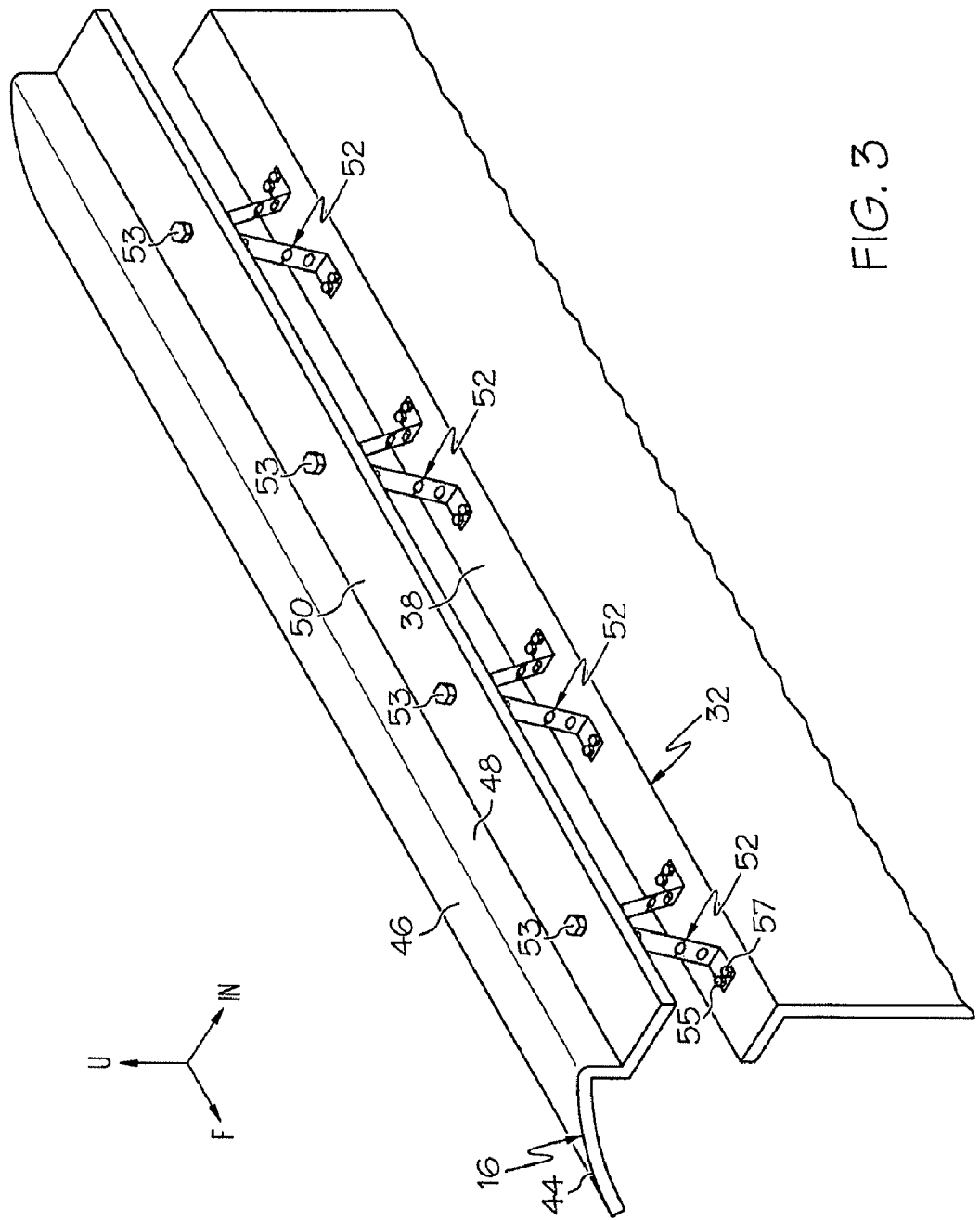
FIG. 3 is a perspective view of the fender structure of FIG. 2.

Referring to FIGS. 2 and 3, the front fender 16 includes an outer wall 44 that extends vertically downward from a top end portion 46 of the outer wall 44 toward a front wheel of the vehicle 10. An inner wall 48 extends downwardly from the top end portion 46 at the boundary line 18 to a horizontal connecting wall 50 disposed at least partially below the hood 14.

An attachment bracket 52 connects the front fender 16 at the horizontal connecting wall 50 to the upper apron member 32 at the horizontal portion 38. A fastener 53 may connect the attachment bracket 52 to the connecting wall 50 and fasteners 55 and 57 may connect the attachment bracket 52 to the upper apron member 32. As will be described in greater detail below, the attachment bracket 52 includes one or more features that may provide a predictable deformation pattern for the attachment bracket 52 and absorb impact energy when a headform impacts the hood 14 of the vehicle 10.

Figure 4:
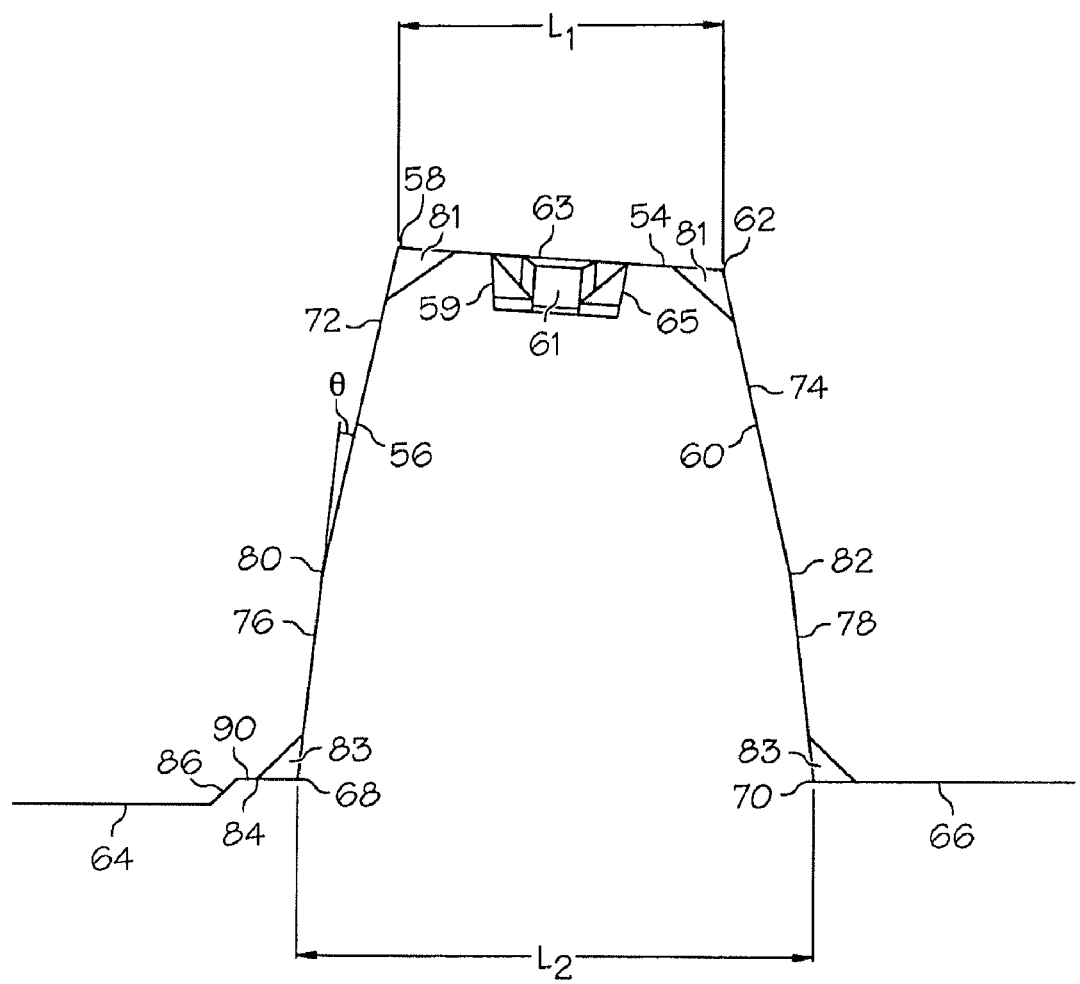
FIG. 4 is a side view of an embodiment of an attachment bracket for use in the fender structure of FIG. 2.

Referring to FIG. 4, the attachment bracket 52 may include a top portion 54, a first vertical leg 56 located at a first end 58 of the top portion 54 and a second vertical leg 60 located at an opposite second end 62 of the top portion 54. The top portion 54 may include connecting structure 63 for attaching the attachment bracket 52 to the horizontal connecting wall 50 of the front fender 16. In one embodiment, the connecting structure 63 is a bolt receiving structure 65 having a downwardly extending wall 59 and an opening 61 extending therethrough. A foot 64 and 66 is illustrated as extending outwardly from the legs 56 and 60 away from the top portion 54 at a bottom edge 68 and 70 of each leg 56 and 60. The feet 64 and 66 may be used to connect the attachment bracket 52 to the horizontal portion 36 of the upper apron member 32. The feet 64 and 66 may include openings 67, 69, 71 and 73 (see FIG. 5) through which the fasteners 55 and 57 may be inserted. In other embodiments, fasteners 55 and 57 may not be used to connect the feet 64 and 66 to the upper apron member 32. For example, the feet 64 and 66 may be welded to the upper apron member 32.

The legs 56 and 60 may include upper portions 72 and 74 and lower portions 76 and 78 connected by bends 80 and 82. As can be seen, the upper portions 72 and 74 may have an angle θ to the vertical that is greater than an angle of the lower portions 76 and 78 to the vertical thereby creating outward bends 80 and 82 that extend away from each other. The upper portions 72 and 74, in some embodiments, taper toward each other at a slope greater than the lower portions 76 and 78. In one embodiment, the lower portions 76 and 78 are vertical and substantially parallel to each other. In some embodiments, the top portion 54 has a length $L_1$ that is greater than a length $L_2$ between bottom edges 68 and 70 at a base of the attachment bracket 52.

Figure 5:
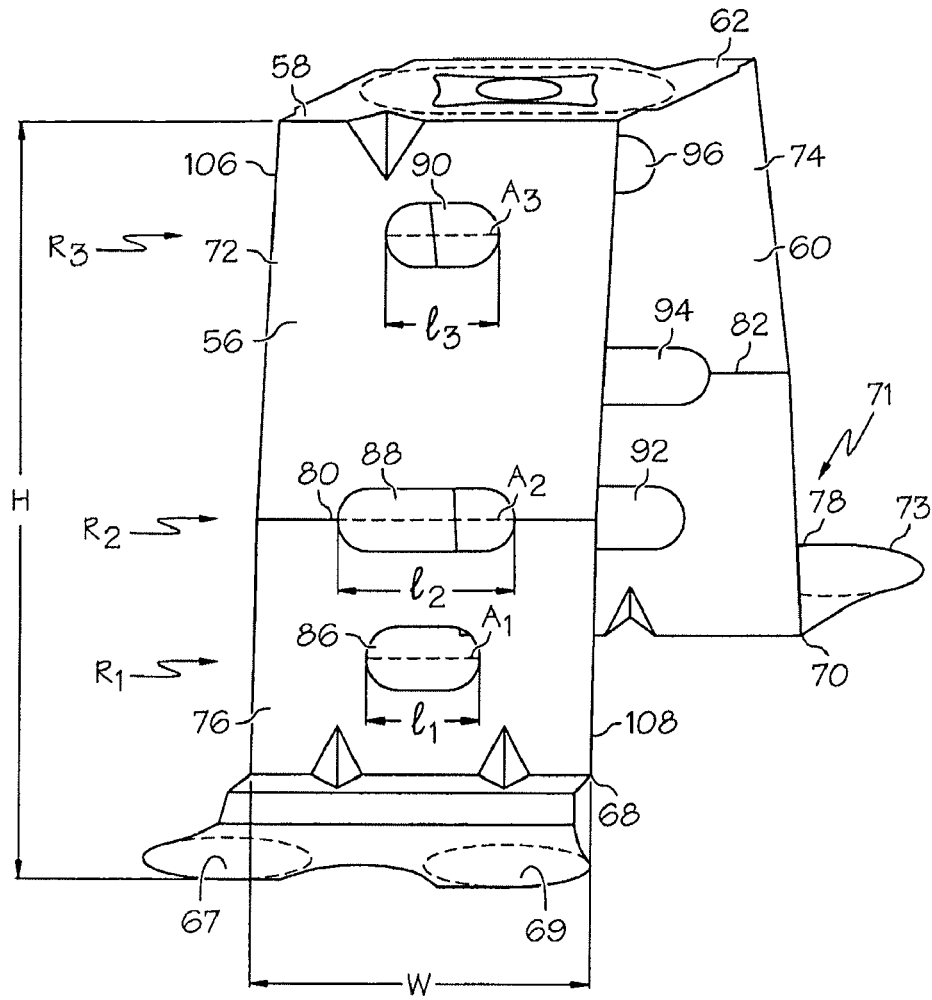
FIG. 5 is a perspective view of the attachment bracket of FIG. 4.

Upper and lower gussets 81 and 83 are provided at the ends 58 and 62 and bottom edges 68 and 70 (see FIG. 5). The gussets 81 extend from the upper portions 72 and 74 to the top portion 54 over the ends 58 and 62. The gussets 83 extend from the lower portions 76 and 78 to the feet 64 and 66 over the bottom edges 68 and 70. The gussets 81 and 83 may provide strength to the attachment bracket 52 in the widthwise vehicle direction.

In one embodiment, as shown, the leg 56 includes an extension portion 84 between the foot 64 and the lower portion 76 of the leg 56. The extension portion 84 includes a step 86 with a flat region 90. The extension portion 84 locates foot 64 vertically below foot 66. Locating foot 64 below foot 66 may allow the attachment bracket 52 to be connected to a horizontal portion 36 having an upper surface of differing elevations. For example, foot 64 may rest on a region of the horizontal portion 36 having an elevation that is lower than another region of the horizontal portion 36 on which foot 66 rests. In some embodiments, both legs 56 and 60 may have an extension portion 84 or neither leg may have an extension portion.

Referring to FIG. 5, legs 56 and 60 include openings 86, 88, 90, 92, 94 and 96 that are spaced apart vertically along a length of the legs. Each opening 86, 88, 90, 92, 94 and 96 is located between the ends 58 and 62 and bottom edges 68 and 70 of their respective legs 56 and 60. In particular, openings 86 and 92 are located at lower portions 76 and 78, openings 90 and 96 are located at upper portions 72 and 74 and openings 88 and 94 are located on or intersect the bends 80 and 82.

Figure 5A:
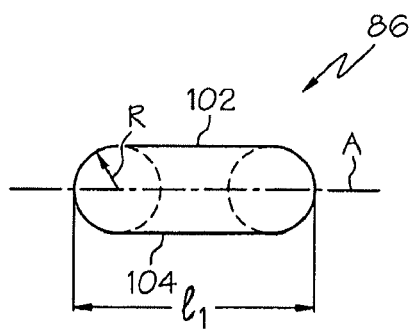

Referring briefly to FIG. 5A, the openings (opening 86 is shown for exemplary purposes) may be oval in shape and formed of a pair of circles (represented by dotted lines 98 and 100) having a radius R. Two substantially straight parallel lines 102 and 104 are tangent to both the circles 98 and 100. In some embodiments, a length l of the openings 86, 88, 90, 92, 94 and 96 is greater than the radius R. In one embodiment, the radii R of each opening 86, 88, 90, 92, 94 and 96 are the same. Alternatively, the radii R of one or more opening 86, 88, 90, 92, 94 and 96 may be different and/or the radii of an individual opening (i.e., of circles 98 and 100) may be different. An axis A of the openings 86, 88, 90, 92, 94 and 96 passing through the center of the openings 86, 88, 90, 92, 94 and 96 is substantially horizontal and the openings may have one or two axes of symmetry. Each opening 86, 88, 90, 92, 94 and 96 in FIG. 4 has two axes of symmetry.

Referring again to FIG. 5, each leg 56 and 60 has a height H measured between the ends 58 and 62 and bottom edges 68 and 70 and each opening has a horizontal axis $A_1$, $A_2$ and $A_3$ (only openings 86, 88 and 90 are shown with axes $A_1$, $A_2$ and $A_3$ for clarity). As an example of one embodiment, a vertical distance from the bottom edge 68 to $A_1$ may be between about 12 percent and about 35 percent, such as about 18 percent of the height H of the leg 56, a vertical distance from the bottom edge to $A_2$ may be between about 30 percent and about 50 percent of the height H of the leg 56, such as about 38 percent (e.g., less than 50 percent) and a vertical distance from the bottom edge to $A_3$ may be between about 50 percent and about 90 percent, such as about 82 percent (e.g., greater than 50 percent) of the height H of the leg 56. In some embodiments, axis $A_2$ coextends with the bend 80. The radius R of the openings 86, 88, 90, 92, 94 and 96 may be less than the height H of the leg 56, such as between about one percent and about ten percent, such as about five percent of the height H of the leg 56. In some embodiments, a distance between $A_1$ and $A_2$ is less than a distance between $A_3$ and $A_2$. In other embodiments, the distance between $A_1$ and $A_2$ and $A_3$ and $A_2$ may be about the same or the distance between $A_3$ and $A_2$ may be less than the distance between $A_1$ and $A_2$.

Each leg 56 and 60 also has a width W measured from one vertical edge 106 to an opposite vertical edge 108. In some embodiments, the width W is substantially the same along the entire height H of the legs 56 and 60. In other embodiments, the width W may change (e.g., the legs may taper in the widthwise direction). Each opening 86, 88, 90, 92, 94 and 96 has a length $l_1$, $l_2$ and $l_3$ running along the respective axes $A_1$, $A_2$ and $A_3$. In the illustrated embodiment, length $l_2$ is greater than lengths $l_1$ and $l_3$. In some embodiments, lengths $l_1$ and $l_3$ may be about the same or different. As an example of one embodiment, length $l_1$ and $l_2$ may be less than the width W, such as between about 20 percent and about 40 percent, such as about 34 percent of the width W and length $l_3$ may be less than the width W, such as between about 40 and about 60 percent, such as about 53 percent of the width W. In some embodiments, each opening 86, 88, 90, 92, 94 and 96 may be centered between the vertical edges 106 and 108.

The openings 86, 88, 90, 92, 94 and 96 may be provided to create regions $R_1$, $R_2$ and $R_3$ of weakness along the legs 56 and 60. The openings 86, 88, 90, 92, 94 and 96 provide a localized increase in stress by reducing the area over which a force may be distributed. The openings 86, 88, 90, 92, 94 and 96 are shaped to create a predictable horizontal buckling of the legs 56 and 60 in response to a force F applied at the top portion 54.

Figure 6:
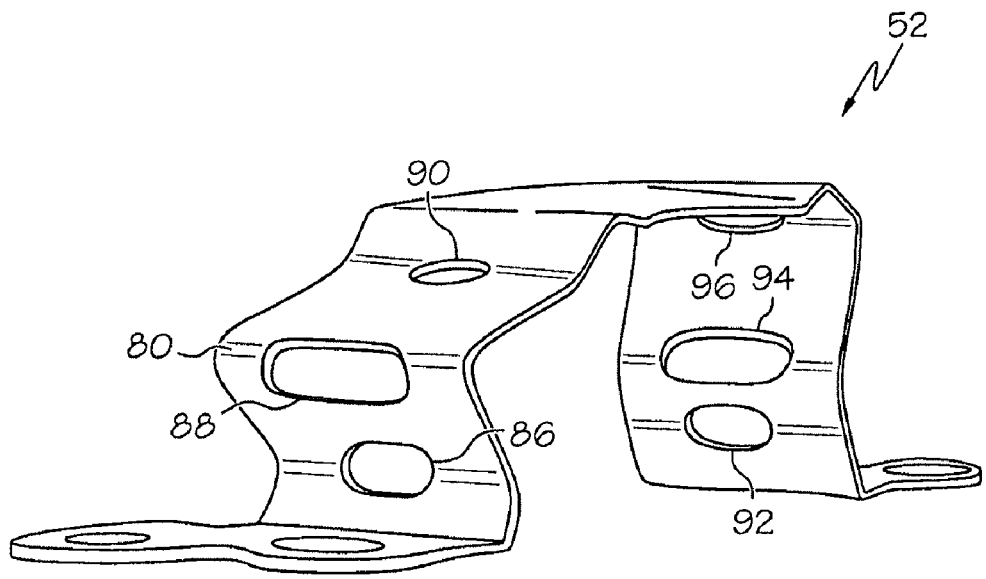
FIG. 6 is a perspective view of the attachment bracket of FIG. 4 in a deformed configuration.
Figure 7:
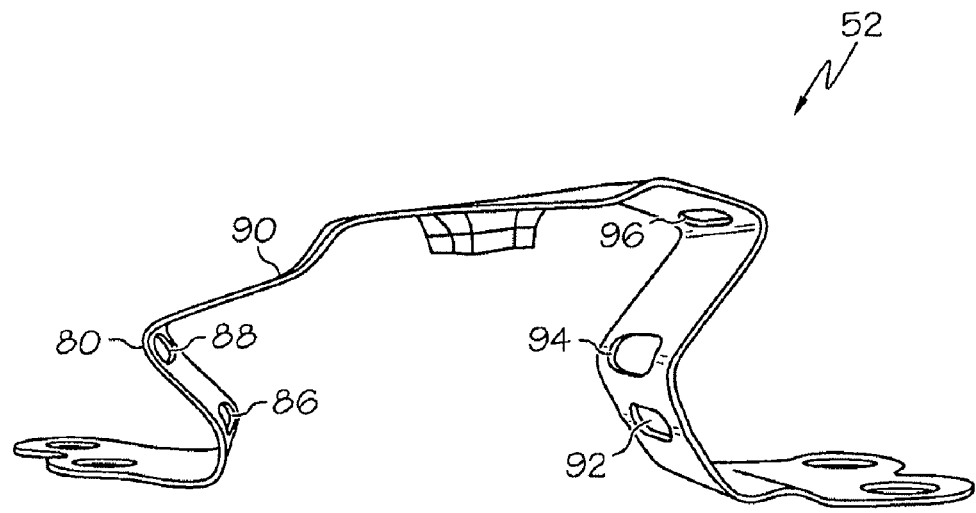
FIG. 7 is a side view of the attachment bracket of FIG. 6 is the deformed configuration.

Referring to FIGS. 6 and 7, the attachment bracket 52 is shown in a buckled configuration. Initial, primary buckling occurs at the bend 80 and at opening 96. Primary buckling occurs at the bend 80 as region $R_2$ may be the weakest due to the bend 80 and larger opening 88. Secondary buckling occurs at openings 86, 90, 92 and 94. Thus, buckling may occur at all six openings 86, 88, 90, 92, 94 and 96.

Figure 8:
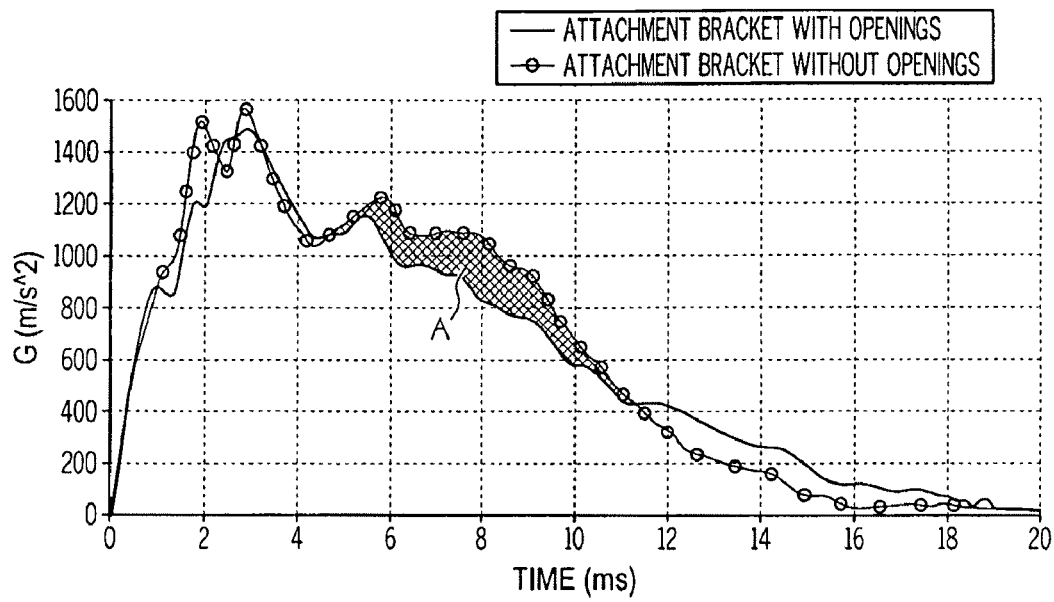
FIG. 8 is a graph of acceleration versus time for a pedestrian impact test using the attachment bracket of FIG. 4.
Figure 9:
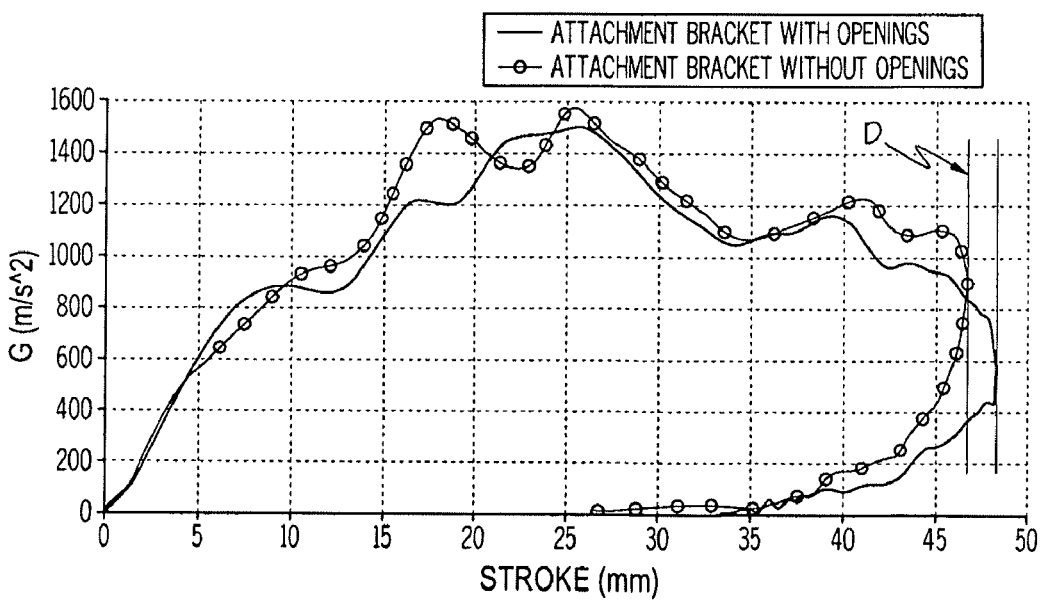
FIG. 9 is a graph of acceleration versus displacement for the pedestrian impact test using the attachment bracket of FIG. 4.

The above-described attachment bracket 52 allows for greater vertical bracket displacement and lower head decelerations which can lower head injury values (HIC). Referring to FIG. 8, a graph of acceleration versus time is shown for the attachment bracket 52 with the openings 86, 88, 90, 92, 94 and 96 compared to an attachment bracket similar to the attachment bracket 52 without the openings 86, 88, 90, 92, 94 and 96. The graph of FIG. 8 may be generated using the JNCAP testing procedures for child pedestrians. As can be seen, the attachment bracket 52 with openings 86, 88, 90, 92, 94 and 96 provides a decrease in headform acceleration within region A compared to the attachment bracket without openings 86, 88, 90, 92, 94 and 96. Referring now to FIG. 9, a graph of acceleration versus stroke shows that the attachment bracket 52 with openings 86, 88, 90, 92, 94 and 96 gives more displacement (see region D) than the attachment bracket without openings 86, 88, 90, 92, 94 and 96.

The above attachment bracket 52 may be formed of any suitable material such as a metal material (e.g., steel). Any suitable process or combination of processes may be used to form the attachment bracket 52 such as bending, stamping, machining, etc.

The above-described attachment bracket 52 provides an attachment structure that may be used to absorb impact energy during a front collision. The attachment bracket 52 may provide for lower head decelerations and greater vertical displacement, which can reduce HIC values. Under JNCAP testing conditions, HIC values may be reduced by about 15 percent to 20 percent or more by utilizing the attachment brackets 52.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle having a panel support assembly, the vehicle comprising:
   a panel having a connecting portion;
   a structural member; and
   an attachment bracket that mounts the panel to the structural member, the attachment bracket comprising:
      a top portion connected to the connecting portion;
      a leg connected to the structural member, the leg extending toward the structural member from an edge of the top portion, the leg including a bend separating the leg into an upper portion and a lower portion, the leg having an opening at the bend that is spaced from the top portion and a bottom end of the leg.

2. The vehicle of claim 1, wherein the leg is a first leg, the attachment bracket including a second leg connected to the structural member, the second leg extending toward the structural member from an edge of the top portion.

3. The vehicle of claim 2, wherein the second leg includes a bend separating the second leg into an upper portion and a lower portion, the second leg having an opening at the bend of the second leg that is spaced from the top portion and a bottom end of the second leg.

4. The vehicle of claim 1, wherein the attachment bracket has an upper opening at the upper portion of the leg and a lower opening at the lower portion of the leg.

5. The vehicle of claim 4, wherein a distance from the bottom end to a center of the lower opening is between about 12 percent and about 35 percent of a height of the leg measured between the bottom end and the edge of the top portion from which the leg extends.

6. The vehicle of claim 4, wherein a distance from the bottom end to a center of the upper opening is between about 50 percent and about 90 percent of a height of the leg measured between the bottom end and the edge of the top portion from which the leg extends.

7. The vehicle of claim 1, wherein a distance from the bottom end to a center of the opening is between about 30 percent and about 50 percent of a height of the leg measured between the bottom end and the edge of the top portion from which the leg extends.

8. A vehicle having a panel support assembly, the vehicle comprising:
   a panel having a connecting portion;
   a structural member; and an attachment bracket that mounts the panel to the structural member, the attachment bracket comprising:

a top portion connected to the connecting portion;

a leg connected to the structural member at a bottom end of the leg, the leg extending toward the structural member from an edge of the top portion, the leg having an upper opening portion that is between about 50 percent and about 90 percent of a height of the leg measured between the bottom end and the edge of the top portion from which the leg extends, a lower opening portion that is between about 12 percent and about 35 percent of a height of the leg measured between the bottom end and the edge of the top portion from which the leg extends and a central opening portion at a bend that separates the leg into an upper portion and a lower portion.

9. The vehicle of claim 8, wherein the leg has a central opening portion.

10. The vehicle of claim 8, wherein the upper opening portion is at the upper portion of the leg and the lower opening portion is at the lower portion of the leg.

11. The vehicle of claim 8, wherein the leg is a first leg, the attachment bracket including a second leg connected to the structural member, the second leg extending toward the structural member from an edge of the top portion.

12. The vehicle of claim 11, wherein the second leg has an upper opening portion that is between about 50 percent and about 90 percent of a height of the second leg measured between the bottom end and the edge of the top portion from which the second leg extends and a lower opening portion that is between about 12 percent and about 35 percent of a height of the second leg measured between the bottom end and the edge of the top portion from which the second leg extends.

13. The vehicle of claim 12, wherein the second leg includes a bend separating the second leg into an upper portion and a lower portion.

14. The vehicle of claim 13, wherein the upper opening portion of the second leg is at the upper portion of the second leg and the lower opening portion of the second leg is at the lower portion of the second leg.

15. The vehicle of claim 13, wherein the second leg has a central opening portion at the bend of the second leg.

16. A vehicle having a panel support assembly, the vehicle comprising:

a panel having a connecting portion;

a structural member; and an attachment bracket that mounts the panel to the structural member, the attachment bracket comprising:

a top portion connected to the connecting portion;

a first leg connected to the structural member, the first leg extending from an edge of the top portion toward the structural member and including two or more openings spaced-apart from each other along a length of the first leg; and a second leg connected to the structural member, the second leg extending from an opposite edge of the top portion toward the structural member and including two or more openings spaced-apart from each other along a length of the second leg.

17. The vehicle of claim 16, wherein the first leg includes a bend that separates the first leg into an upper portion and a lower portion.

18. The vehicle of claim 16, wherein the second leg includes a bend that separates the second leg into an upper portion and a lower portion.

19. The vehicle of claim 17, wherein one of the two or more openings of the first leg is located at the bend.

* * * * *